United States Patent [19]
Berson

[11] Patent Number: 5,388,158
[45] Date of Patent: Feb. 7, 1995

[54] SECURE DOCUMENT AND METHOD AND APPARATUS FOR PRODUCING AND AUTHENTICATING SAME

[75] Inventor: William Berson, Westport, Conn.

[73] Assignee: Pitney Bowes Inc., Stamford, Conn.

[21] Appl. No.: 979,116

[22] Filed: Nov. 20, 1992

[51] Int. Cl.$^6$ .................... H04L 9/32; H04L 9/30; H04L 9/08

[52] U.S. Cl. ........................ 380/23; 380/18; 380/21; 380/30; 380/49; 380/54

[58] Field of Search ............... 380/18, 21, 23, 30, 380/54, 25, 49, 50

[56] References Cited

U.S. PATENT DOCUMENTS

| | | | |
|---|---|---|---|
| 3,889,056 | 6/1975 | Mayer, Jr. et al. | 380/54 |
| 4,202,626 | 5/1980 | Mayer, Jr. et al. | 380/54 X |
| 4,663,622 | 5/1987 | Goldman et al. | 340/825.34 |
| 4,972,476 | 11/1990 | Nathans | 380/54 X |
| 4,995,081 | 2/1991 | Leighton et al. | 380/23 |
| 5,027,401 | 6/1991 | Soltesz | 380/54 |
| 5,097,504 | 3/1992 | Camion et al. | 380/23 |
| 5,101,038 | 7/1992 | Puhl et al. | 380/23 |
| 5,135,569 | 8/1992 | Mathias | 106/22 |
| 5,136,647 | 8/1992 | Haber et al. | 380/49 |
| 5,142,578 | 8/1992 | Matyas et al. | 380/21 |
| 5,157,726 | 10/1992 | Merkle et al. | 380/23 |
| 5,159,635 | 10/1992 | Wang | 380/18 |
| 5,163,091 | 11/1992 | Graziano et al. | 380/25 |
| 5,180,906 | 1/1993 | Yamada | 235/487 |
| 5,189,700 | 2/1993 | Blandford | 380/23 |
| 5,191,613 | 3/1993 | Graziano et al. | 380/25 |

OTHER PUBLICATIONS

Phototrace in Automatic I.D. News by Greg Smith Minneapolis, date unknown.

Primary Examiner—Bernarr E. Gregory
Attorney, Agent, or Firm—Robert H. Whisker; Melvin J. Scolnick

[57] ABSTRACT

A document secure against tampering or alteration and method and apparatus for producing and authenticating such a document. A document is scanned to produce a digital signal which is compressed, encrypted, and coded as a two dimensional barcode or as some other appropriate form of coding, which is incorporated into a label which is the affixed to the document. In one embodiment the signal representing the image is encrypted using a public key encryption system and the key is downloaded from a center. This key maybe changed from time to time to increase security. To facilitate authentication the corresponding decryption key is encrypted with another key and incorporated on the card. To validate the document the coded signal is scanned from the label, decoded, decrypted, expanded and displayed. The card may then be authenticated by comparison of the displayed representation of the image and the document.

11 Claims, 2 Drawing Sheets

SECURE DOCUMENT AND METHOD AND APPARATUS FOR PRODUCING AND AUTHENTICATING SAME

BACKGROUND OF THE INVENTION

The subject invention relates to a document or similar item. More particularly, it relates to a document or similar item which has a high degree of security against tampering, and to methods and apparatus for producing and authenticating such documents.

U.S. Pat. No. 4,853,961; for: "Reliable Document Authentication System"; to: Pastor; issued: Aug. 1, 1989, discloses a system wherein a document is authenticated by encryption using a public key encryption system. The invention of the Pastor patent teaches authentication of a document by encryption of information derived from the document, incorporating that encrypted information into the document, recovering the encrypted information from the document and decrypting it, and comparing it to the information as originally included in the document.

While believed to be generally very effective for authenticating documents to detect alteration or tampering, the above described invention suffers from certain disadvantages with existing documents, or documents which are produced to an already defined format. For existing documents it is necessary to input information from the document to create the encrypted information. Typically, this would be done either by manual keyboard input or by some form of character recognition technology. Also, where documents are produced in large numbers to already defined format, e.g. driver's licenses, it is difficult to modify the format to provide for incorporation of the encrypted information in accordance with the Pastor patent.

Thus, it is object of the subject invention to provide a method and apparatus for producing a secure document, which are easily applied to existing documents or documents produced in a predefined format.

BRIEF SUMMARY OF THE INVENTION

The above object is achieved and the disadvantages of the prior art are overcome in accordance with the subject invention by means of a method and apparatus for producing a secure document and for authenticating that document. Apparatus for producing a secure document includes a scanner for producing a first signal representative of an image of the document. The apparatus further includes an encrypter for encrypting a second signal, which is derived, at least in part, from the first signal, and which includes a representation of the image; and a coder for incorporating a coded representation of the encryption of the second signal onto a label to be affixed to the document.

(As used herein the term "label" preferably describes a conventional label such as an address label. However, it is within the contemplation of the subject invention, and as used herein the term "label" means, any object physically distinct from the document, which may incorporate the coded representation and which can be affixed or otherwise permanently associated with the document.)

Apparatus for authenticating a document so produced includes a reader for reading the coded representation of the second signal from the affixed label, a decoder for decoding the coded representation of the second signal, a decrypter for decrypting the decoded signal, and a display for displaying the representation of the image incorporated in the second signal.

In accordance with the method of the subject invention the document to be secured is scanned to produce the first signal. The second signal, which is derived at least in part from the first signal, and which includes a representation of the image is encrypted and coded and incorporated in the label to be affixed to the document.

Once produced the document is then authenticated by reading the coded representation of the second signal from the affixed label, decoding and decrypting the second signal, and controlling a display in accordance with the decrypted second signal to display the representation of the image which is included in the second signal. The displayed representation of the image and the document are then compared to authenticate the document as free from tampering or attention.

In accordance with one aspect of the subject invention the first signal is converted into a digital signal for processing.

In accordance with another aspect of the subject invention the second signal includes a compressed form of the first signal.

(Signal compression is well known to those skilled in the art and, in the case of digital signals, involves the application of a predetermined algorithm to a signal to reduce the number of bytes which must transmitted or processed, while still retaining substantially all of the information represented by the signal.)

In accordance with another aspect of the subject invention the second signal is encrypted using an encryption key $E_i$, for a public key encryption system.

In accordance with still another aspect of the subject invention a decryption key, $D_i$ which correspondences to the key, $E_i$, is encrypted with a second encryption key, $E_1$, for the public key encryption system, and the resulting encrypted decryption key $E_1[D_i]$, is appended to the encrypted second signal prior to incorporation of the second signal into the second portion of the document.

In accordance with still another aspect of the subject invention the encrypted second signal is printed on the label as a two dimensional barcode.

In accordance with yet still another aspect of the subject invention the apparatus for authenticating the document card stores a decryption key $D_1$, corresponding to key $E_1$ and the decryption of the encrypted second signal includes the step of decrypting the encrypted key, $E_1[D_i]$, using the decryption key, $D_1$, to obtain the decryption key $D_i$, which may then be used to decrypt the encrypted second signal.

Thus, it can be seen that the subject invention achieves the above stated object by providing a method and apparatus for producing a secure document which includes an image which may be easily compared to document, and which is highly resistant to tampering. Other objects and advantages of the subject invention will be readily apparent to those skilled in the art from consideration of the attached drawings and the detailed description set forth below.

DETAILED DESCRIPTION OF PREFERRED EMBODIMENTS OF THE SUBJECT INVENTION

Figure 1:
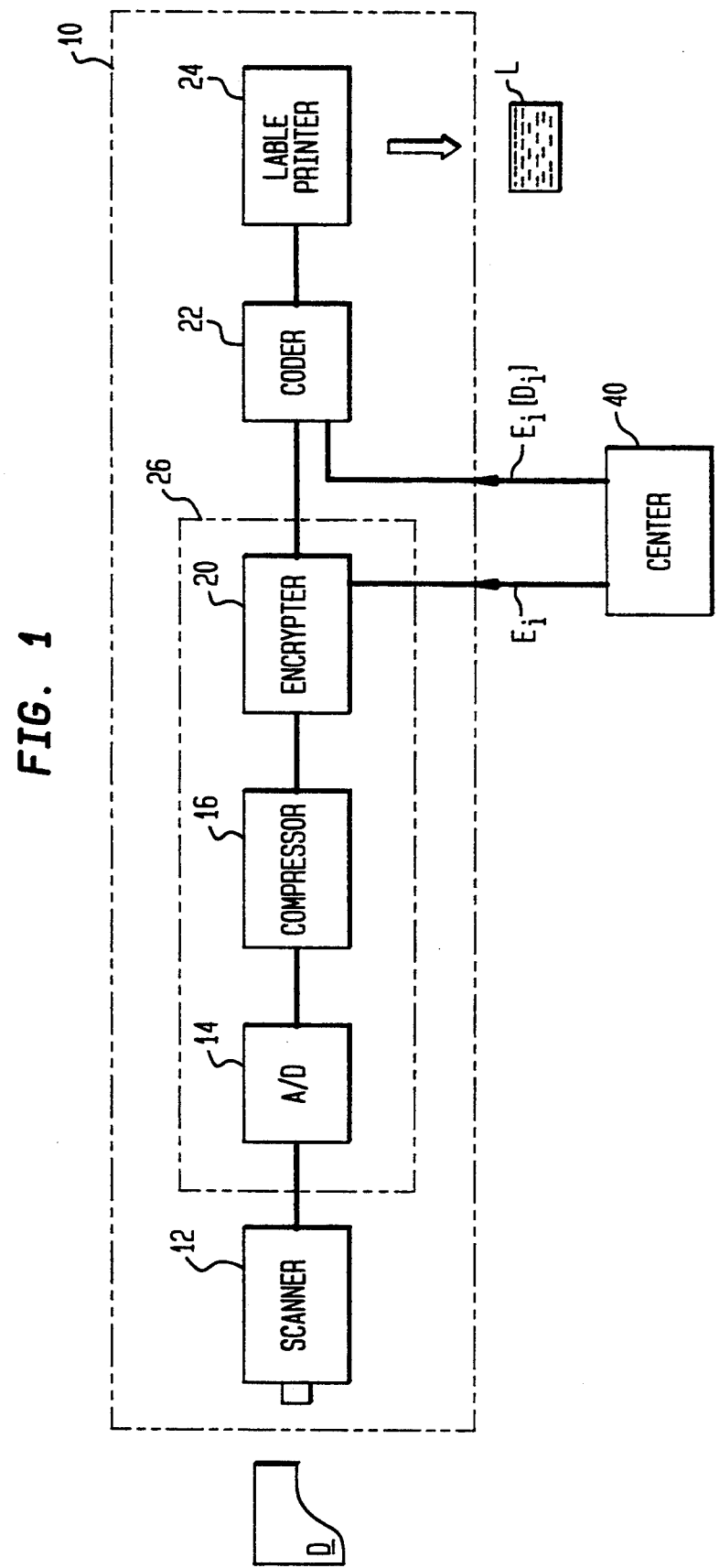
FIG. 1 is a schematic block diagram of an apparatus for producing a secure document in accordance with the subject invention.

FIG. 1 shows a schematic block diagram of apparatus 10 for producing a label L. A document for which the label is intended is scanned by a conventional video scanner 12 to produce a first signal representative of that document D's image. Preferably, the first signal is then converted to a digital form by an analog-to-digital convertor 14 for processing in the digital domain. It is however within the contemplation of the subject invention that at least the signal compression and encryption techniques to be described below may be carried out in the analog domain using signal compression and scrambling technologies well known to those in the analog signal processing arts.

In one embodiment of the subject invention scanning and compression are done using well known Group III facsimile technology, though other suitable scanning and compression methods are within the contemplation of the subject invention.

The first signal is then input to a compression module 16 where it is compressed to reduce the amount of data which must be stored on label L.

It should be noted that where label L is to have substantially the same form as an address label or the like, data compression is, at the present state of technology, necessary. However, with anticipated improvements in data storage technology, or in applications where the document may comprise a high capacity storage medium (e.g. a floppy disk), it is within the contemplation of the subject invention that the first signal may not require compression but that the full signal may be processed as will be described further below.

Data compression algorithms, for compression of image signals, are known to those skilled in the art. Preferably scanning and signal compression are carried out in accordance with the well known standard for Group III facsimile transmission. Further description of the operation of compressor 16 is not believed necessary to an understanding of the subject invention.

The compressed first signal is then input to an encrypter 20 to be included in the encrypted second signal which will be incorporated into label L as will be described further below. Preferably encrypter 20 encrypts the second signal using an encryption key, $E_i$, for a public key encryption system such as the well known RSA system.

The encrypted second signal is then encoded in accordance with some predetermined format by coder module 22, which controls code generator 24 to incorporate the encoded encrypted second signal in a portion of document.

In accordance with a preferred embodiment of the subject invention the coded signal is coded as a two dimensional barcode, such as the PDF-417 standard barcode, developed by the Symbol Technology Corporation of New York. However, the encrypted second signal may be coded into any suitable format. For example, for a smart card or a memory card coder 22 and code generator 24 may store the coded second signal as an appropriately formatted binary data block.

In the preferred embodiment where the coded second signal is represented as a two dimensional barcode the barcode will preferably be printed on label L.

In a preferred embodiment of the subject invention compressor module 16, encrypter module 20, and coder module 22 are implemented as software modules in microprocessor 26; which is preferably, an Intel model 80386, or the like, or other microprocessors of greater capacity.

In a preferred embodiment of the subject invention a center 40 transmits encryption code $E_i$ to encrypter module 20. In order to increase the security of label L key $E_i$ maybe changed from time to time. For the highest level of security key $E_i$ maybe changed for each card C produced, or a different key may even be used to encrypt different portions of the second signal.

To facilitate decryption of the second signal in an environment where key $E_i$ is frequently changed center 40 also transmits an encrypted decryption key $E_1[D_i]$ to be appended to the encrypted second signal by coder module 22. Thus, as will be seen below, when document D is to be authenticated the necessary decryption key $D_i$ can be obtained by decrypting $E_1[D_i]$.

Typically, encryption/decryption pair $E_1$, $D_1$ will remain substantially constant during operation of system 10. However, in applications where system 10 is used to produced labels L for various organizations different pairs $E_1$ $D_1$ may be used for different organizations.

Figure 2:
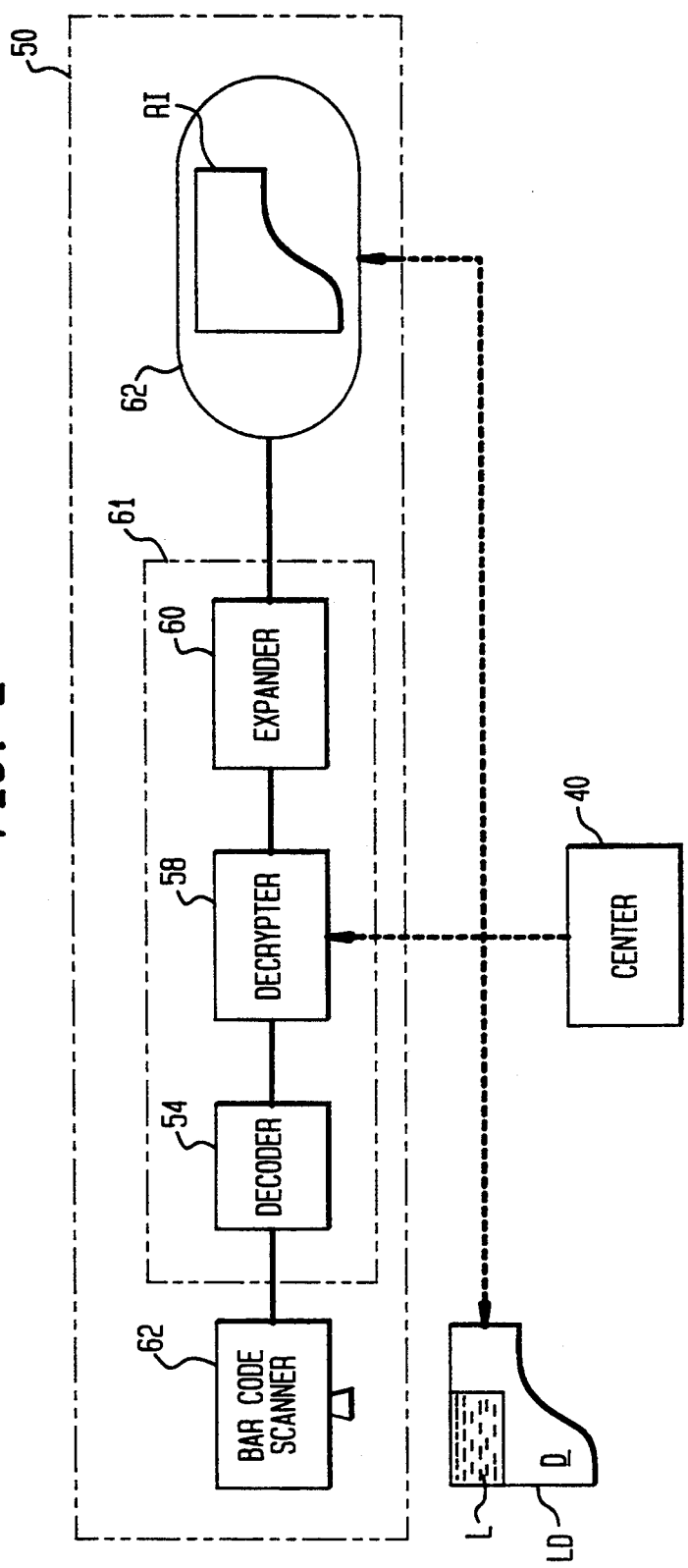
FIG. 2 is a schematic block diagram of an apparatus for authenticating a secure document produced in accordance with the subject invention.

Turning now to FIG. 2 apparatus 50 for authenticating a labeled document LD, having label L affixed is shown. The label L of card C is scanned by a barcode scanner 52 having the capability to scan an appropriate two dimensional barcode. The scanned signal is then decoded by decoder module 54 and decrypted by decrypter module 58. In a preferred embodiment of the subject invention decrypter 58 stores decryption key $D_1$ which is used to decrypt encrypted key $E_1[D_i]$ to obtain decryption key $D_i$. Key $D_i$ is then used to decrypt the decoded signal scanned from label L.

Key $D_1$ is obtained by decrypter 58 from center 40. Typically, $D_1$ will remain constant during operation of system 50, as described above, and a direct communication link between system 50 and center 40 is not necessary and key $D_1$ maybe transmitted in any convenient manner. However, for example, in one application, where label L has a predetermined expiration date it may be desirable to change key $D_1$ after the expiration date and if such expiration dates occur sufficiently often a direct communication link to center 40 maybe included in system 50.

The decrypted scan signal is then expanded in by an algorithm complimentary to the compression algorithm used in system 10, in a conventional manner which need not be described further for an understanding of the subject invention.

In a preferred embodiment of the subject invention decoder module 54, decrypter module 58, and expander module 60 maybe implemented as software modules in a microprocessor 61.

The decrypted, expanded signal is then displayed by a conventional display 62. The display includes a representation RI of the image of document D. To authenticate labeled document LD it is compared with representation RI. It should be noted that with compression representation RI will be somewhat degraded. It has been found however that using the above described Group III facsimile standard a sufficiently accurate representation of an image of a $8\frac{1}{2} \times 11$ size text document may be coded as approximately 2,000 bytes of data and printed using the above described PDF-417 two dimensional barcode in an area of approximately 3.5×2.5 inches. Of course, as described above, with improvements in storage technology and/or the use of media having a higher data storage capacity as embodiments of label L representation RI can be arbitrarily accurately.

The preferred embodiments described above have been given by way of example only, and other embodiments of the subject invention will be apparent to those skilled in the art from consideration of the detailed descriptions set forth above and the attached drawings. Accordingly, limitations on the subject invention are to be found only in the claims set forth below.

What is claimed is:

1. A method of producing and authenticating a secure document comprising the steps of:
   a) scanning said document to produce a first signal representative of an image of said at least a portion of said document;
   b) encrypting a second signal, comprising a representation of said image, said second signal being derived at least in part from said first signal;
   c) incorporating a coded representation of said encrypted second signal with said document;
   d) reading said coded representation of said second signal from said document;
   e) decoding said second signal;
   f) decrypting said decoded second signal;
   g) inputting said decrypted second signal to a display to display said representation of said image;
   h) comparing said document to said displayed image to authenticate said document.

2. A method as described in claim 1 further comprising converting said first signal into a digital signal.

3. A method as described in claim 2 wherein said second signal comprises a compressed form of said first signal.

4. A method as described in claim 3 where said second signal is encrypted using an encryption key, $E_i$, for a public key encryption system.

5. A method as described in claim 4 wherein a decryption key, $D_i$, corresponding to said encryption key, $E_i$, is encrypted with a second encryption key, $E_1$, for said public key encryption system.

6. A method as described in claim 5 wherein said encrypted decryption key, $E_1[D_i]$, is appended to said encrypted second signal prior to incorporation with said document.

7. A method as described in claim 6 wherein said representation of said encrypted second signal is incorporated with said document as a two dimensional barcode.

8. A method as described in claim 6 wherein decryption of said encrypted second signal comprises the further steps of decrypting said encrypted key, $E_1[D_i]$ using a decryption key, $D_1$.

9. A method as described in claim 3 wherein said encrypted second signal is incorporated with said document as a two dimensional barcode.

10. A method as described in claim 2 wherein said coded representation is incorporated into a label and said label is affixed to said document.

11. A method as described in claim 1 wherein said coded representation is incorporated into a label and said label is affixed to said document.

* * * * *